United States Patent
Sasaki et al.

(10) Patent No.: US 12,477,755 B2
(45) Date of Patent: Nov. 18, 2025

(54) VARIABLE CAPACITOR AND INTEGRATED CIRCUIT

(71) Applicant: TDK CORPORATION, Tokyo (JP)

(72) Inventors: Tomoyuki Sasaki, Tokyo (JP); Tatsuo Shibata, Tokyo (JP); Katsuyuki Nakada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/025,812

(22) PCT Filed: Oct. 11, 2022

(86) PCT No.: PCT/JP2022/037856
§ 371 (c)(1),
(2) Date: Mar. 10, 2023

(87) PCT Pub. No.: WO2024/079783
PCT Pub. Date: Apr. 18, 2024

(65) Prior Publication Data
US 2024/0290822 A1    Aug. 29, 2024

(51) Int. Cl.
*H01G 5/16* (2006.01)
*H10D 1/68* (2025.01)

(52) U.S. Cl.
CPC .................................. *H10D 1/692* (2025.01)

(58) Field of Classification Search
CPC .... H10D 1/692; H10D 1/6925; H10D 84/215; H01G 7/00; G11B 5/376; G11B 5/378; G11B 5/3993
See application file for complete search history.

(56) References Cited

U.S. PATENT DOCUMENTS

| | | | |
|---|---|---|---|
| 6,381,171 B1 * | 4/2002 | Inomata | G11C 11/15 365/171 |
| 2009/0310275 A1 | 12/2009 | Katta | |
| 2011/0051227 A1 | 3/2011 | Arahira | |
| 2011/0051313 A1 | 3/2011 | Hwang | |
| 2011/0073783 A1 | 3/2011 | Arahira | |
| 2013/0258453 A1 | 10/2013 | Arahira | |

(Continued)

FOREIGN PATENT DOCUMENTS

| | | |
|---|---|---|
| JP | H08-008142 A | 1/1996 |
| JP | 2006-133726 A | 5/2006 |

(Continued)

*Primary Examiner* — John A Bodnar
(74) *Attorney, Agent, or Firm* — Oliff PLC (57) ABSTRACT

A variable capacitor includes: a first conductive layer; a second conductive layer; and a capacitance layer sandwiched between the first conductive layer and the second conductive layer. Each of the first conductive layer and the second conductive layer is a ferromagnetic layer containing a ferromagnetic material. The first conductive layer has a first magnetic domain and a second magnetic domain having magnetization oriented in a direction different from the first magnetic domain. In the variable capacitor, a domain wall which is a boundary between the first magnetic domain and the second magnetic domain is configured to be movable within at least an area of the first conductive layer overlapping the capacitance layer in a laminating direction in a first direction within a plane of the first conductive layer.

15 Claims, 8 Drawing Sheets

(56) References Cited

U.S. PATENT DOCUMENTS

| | | |
|---|---|---|
| 2014/0313637 A1 | 10/2014 | Shukh |
| 2015/0179345 A1 | 6/2015 | Hong et al. |
| 2017/0093381 A1 | 3/2017 | Abdo |
| 2021/0304940 A1 | 9/2021 | Suzuki et al. |

FOREIGN PATENT DOCUMENTS

| | | |
|---|---|---|
| JP | 2007-511178 A | 4/2007 |
| JP | 2011-048093 A | 3/2011 |
| JP | 2011-075889 A | 4/2011 |
| JP | 2013-025253 A | 2/2013 |
| JP | 2013-205711 A | 10/2013 |
| JP | 2014-067060 A | 4/2014 |
| JP | 2014-067061 A | 4/2014 |
| JP | 2015-073047 A | 4/2015 |
| JP | 2020-205424 A | 12/2020 |
| WO | 2005/046114 A2 | 5/2005 |
| WO | 2008/001914 A1 | 1/2008 |
| WO | 2017/055988 A1 | 4/2017 |
| WO | 2018/069908 A1 | 4/2018 |
| WO | 2018/185542 A1 | 10/2018 |
| WO | 2019/063113 A1 | 4/2019 |
| WO | 2019/086943 A1 | 5/2019 |
| WO | 2019/117949 A1 | 6/2019 |
| WO | 2020/160920 A1 | 8/2020 |
| WO | 2020/197833 A1 | 10/2020 |
| WO | 2020/212092 A1 | 10/2020 |
| WO | 2021/199233 A1 | 10/2021 |

\* cited by examiner

VARIABLE CAPACITOR AND INTEGRATED CIRCUIT

TECHNICAL FIELD

The present invention relates to a variable capacitor and an integrated circuit.

BACKGROUND ART

A variable capacitor is a capacitor capable of continuously changing a capacitance. For example, Patent Document 1 describes a variable capacitor which continuously changes a capacitance by mechanically changing a facing area of a metal plate.

CITATION LIST

Patent Document

[Patent Document 1]
Japanese Unexamined Patent Application, First Publication No. H8-8142

SUMMARY OF INVENTION

Technical Problem

The variable capacitor described in Patent Document 1 requires a mechanism that performs a mechanical operation and it is difficult to miniaturize the variable capacitor. A small-sized variable capacitor is particularly demanded in an area such as a space and a cryogenic environment in which it is difficult to incorporate a large element and an element which exhibits desired characteristics even in such an environment is demanded.

The present invention has been made in view of the above-described circumstances and an object thereof is to provide a variable capacitor and an integrated circuit which are compact and can be operated even in extreme environments.

Solution to Problem (1) A variable capacitor according to a first aspect includes: a first conductive layer; a second conductive layer; and a capacitance layer sandwiched between the first conductive layer and the second conductive layer. Each of the first conductive layer and the second conductive layer is a ferromagnetic layer containing a ferromagnetic material. The first conductive layer has a first magnetic domain and a second magnetic domain having magnetization oriented in a direction different from the first magnetic domain. In the variable capacitor, a domain wall which is a boundary between the first magnetic domain and the second magnetic domain is configured to be movable within at least an area of the first conductive layer overlapping the capacitance layer in a laminating direction in a first direction within a plane of the first conductive layer.

(2) The variable capacitor according to the above-described aspect may further include: a first electrode; and a second electrode. The first electrode contacts the first magnetic domain of the first conductive layer. The second electrode contacts the second magnetic domain of the first conductive layer.

(3) In the variable capacitor according to the above-described aspect, the first electrode is a ferromagnetic layer. The magnetization of the first electrode is oriented in the same direction as the magnetization of the first magnetic domain.

(4) In the variable capacitor according to the above-described aspect, the second electrode is a ferromagnetic layer. The magnetization of the second electrode is oriented in the same direction as the magnetization of the second magnetic domain.

(5) In the variable capacitor according to the above-described aspect, the capacitance layer may contain any one selected from a group consisting of magnesium oxide, aluminum oxide, titanium oxide, barium titanate, magnesium aluminate, silicon oxide, magnesium titanate, and hafnium oxide.

(6) In the variable capacitor according to the above-described aspect, the capacitance layer may contain aluminum nitride or aluminum nitride to which any one selected from a group consisting of calcium, strontium, titanium, and potassium is added.

(7) In the variable capacitor according to the above-described aspect, the capacitance layer may contain any one selected from a group consisting of lead titanate, strontium titanate, lead zirconate, lead hafnate, and relaxor ferroelectrics.

(8) In the variable capacitor according to the above-described aspect, the first conductive layer or the second conductive layer may contain any one selected from a group consisting of a Heusler alloy, a CoPt alloy, a CoNi alloy, a TbFeCo alloy, a CoFe alloy, and a partially substituted thereof.

(9) The variable capacitor according to the above-described aspect may further include a substrate and at least one of the first conductive layer, the capacitance layer, and the second conductive layer may epitaxially grow from the substrate.

(10) In the variable capacitor according to the above-described aspect, lattice matching obtained by dividing a difference between a lattice constant of the capacitance layer and a lattice constant of the first conductive layer by the lattice constant of the first conductive layer may be 10% or more.

(11) In the variable capacitor according to the above-described aspect, the first conductive layer may not have a constant width in a second direction orthogonal to the first direction when viewed from the laminating direction. The width is gradually increased or decreased from a first end to a second end of the first conductive layer.

(12) In the variable capacitor according to the above-described aspect, a minimum capacitance value may be 1 pF or more in a temperature range of 10 K or less or 1000 K or more.

(13) A variable capacitor according to a second aspect includes: a first conductive layer; a second conductive layer; and a capacitance layer sandwiched between the first conductive layer and the second conductive layer. Each of the first conductive layer and the second conductive layer is a ferromagnetic layer containing a ferromagnetic material. In the variable capacitor, a capacitance changes in an analog manner by applying an electrical signal in one direction within a plane of the first conductive layer.

(14) An integrated circuit according to a second aspect includes: a first variable capacitor and a second variable capacitor. Each of the first variable capacitor and the second variable capacitor is the variable capacitor according to the above-described aspect. The first variable capacitor and second variable capacitor are connected in parallel to each other.

(15) In the integrated circuit according to the above-described aspect, the first variable capacitor and the second variable capacitor may have different capacitances.

Advantageous Effects of Invention

The variable capacitor and the integrated circuit according to the above-described aspects are compact and are operated even in extreme environments.

DESCRIPTION OF EMBODIMENTS

Hereinafter, this embodiment will be described in detail by appropriately referring to the drawings. In the drawings used in the following description, the featured portions are enlarged for the sake of convenience in order to easily understand the features of the present invention and the dimensional ratios of the constituent elements may differ from the actual ones. The materials, dimensions, and the like exemplified in the following description are examples, and the present invention is not limited thereto. Then, the materials, dimensions, and the like can be implemented with appropriate modifications within the scope of the present invention.

First, directions will be defined. The x direction and the y direction are directions substantially parallel to one surface of a substrate Sub (for example, see FIG. 4) which will be described later. The x direction is, for example, the longitudinal direction of the first ferromagnetic layer. The y direction is the direction orthogonal to the x direction. The z direction is a direction from the substrate Sub to the variable capacitor. In this specification, the +z direction may be expressed as "up" and the −z direction may be expressed as "down". However, these expressions are for convenience and do not define the direction of gravity. In this specification, "extending in the x direction" means, for example, that the x-direction dimension is larger than the smallest one of the x-direction, y-direction, and z-direction dimensions. The same applies to the case of extending in the other direction.

In addition, "connected" in this specification is not limited to direct connection, but also includes connection via another object.

First Embodiment

Figure 1:
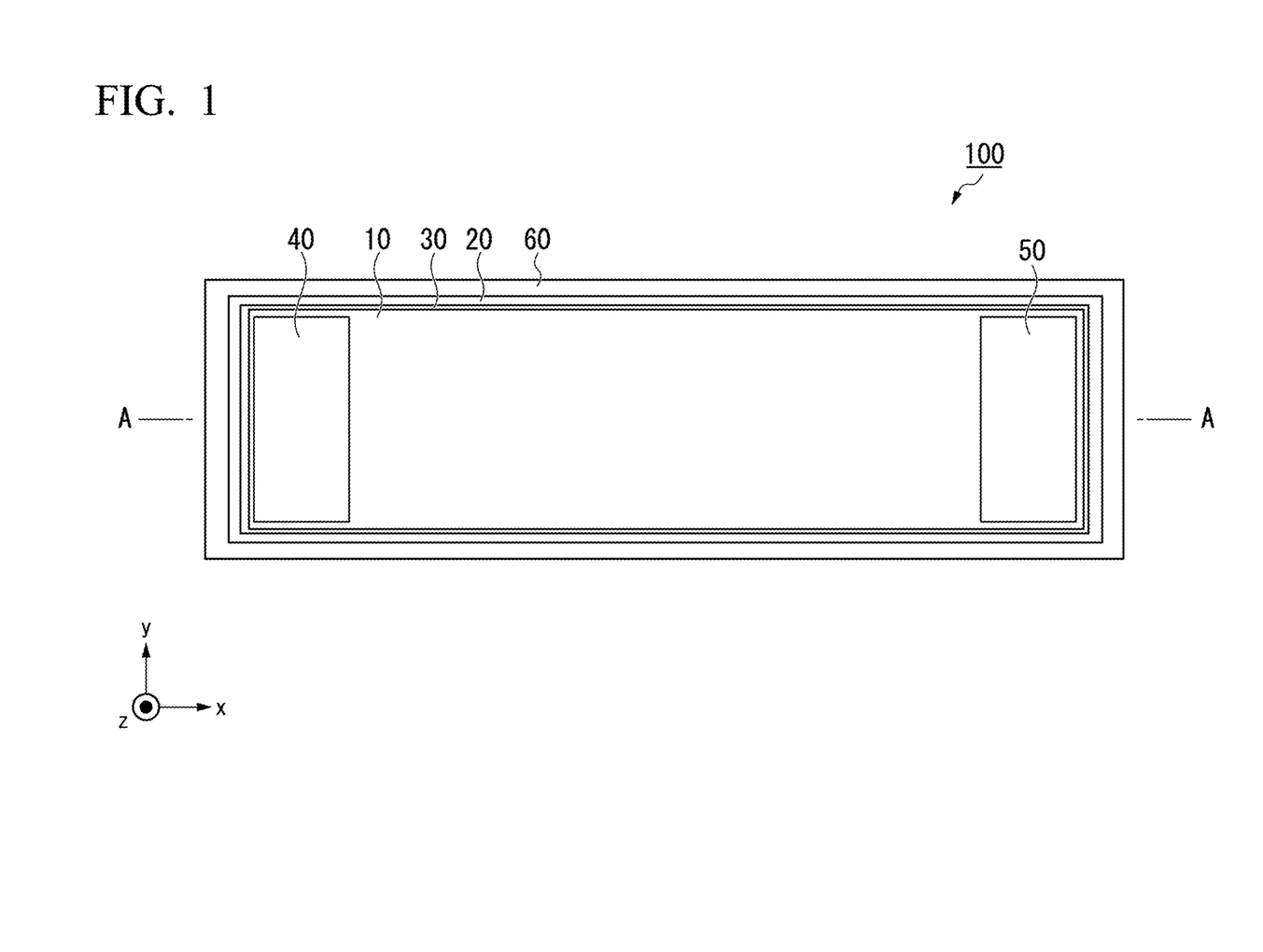
FIG. 1 is a plan view of a variable capacitor according to a first embodiment.
Figure 2:
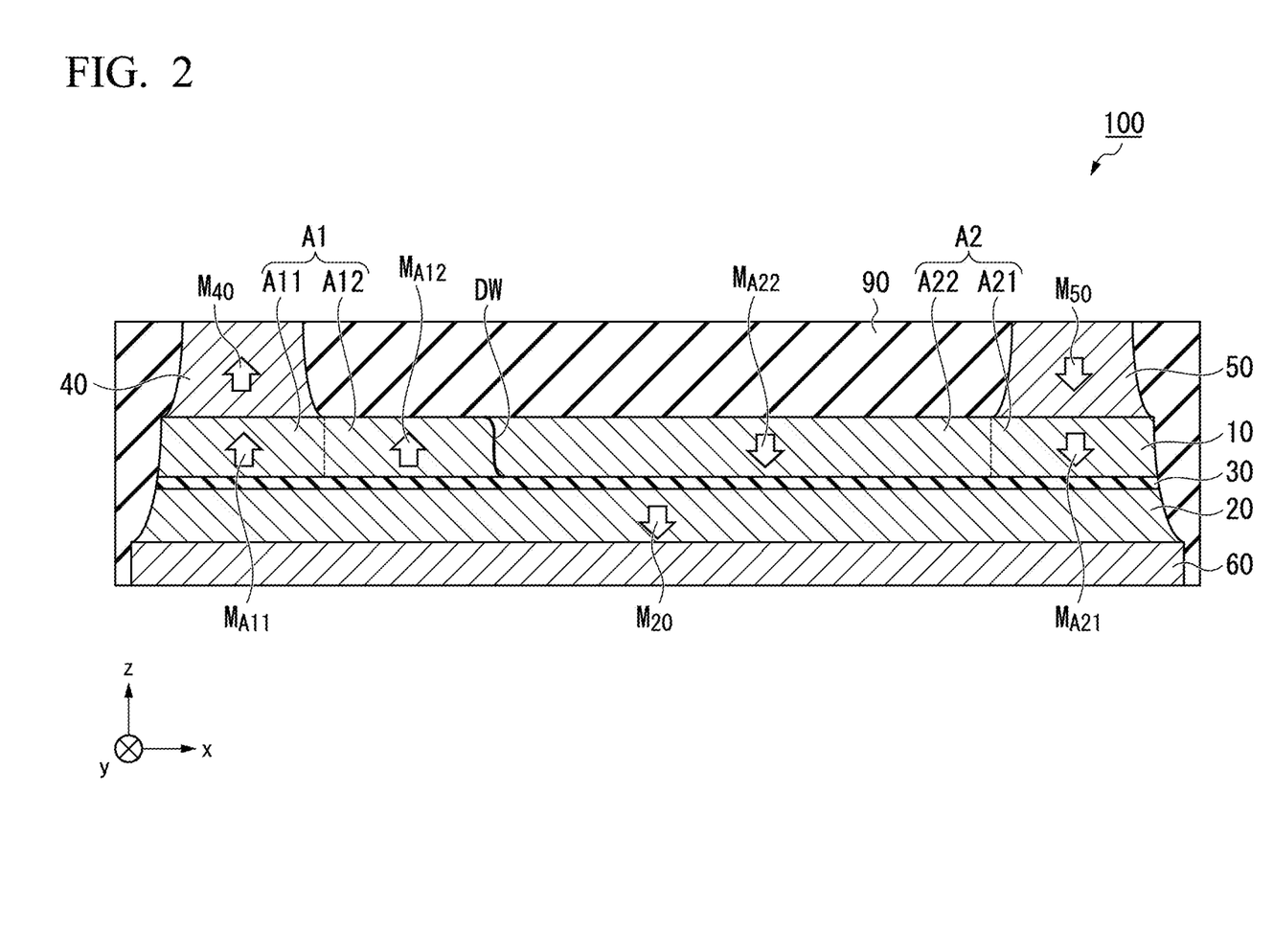
FIG. 2 is a cross-sectional view of the variable capacitor according to the first embodiment.

FIG. 1 is a plan view of a variable capacitor 100 according to a first embodiment. FIG. 2 is a cross-sectional view of the variable capacitor 100 according to the first embodiment. FIG. 2 shows a cross-section taken along a line A-A of FIG. 1.

The variable capacitor 100 includes a first conductive layer 10, a second conductive layer 20, a capacitance layer 30, a first electrode 40, a second electrode 50, and a third electrode 60. The conductance of the variable capacitor 100 changes as the magnetization of the first conductive layer 10 and the second conductive layer 20 sandwiching the capacitance layer 30 changes.

The periphery of the variable capacitor 100 is covered with, for example, an insulating layer 90. The insulating layer 90 is an insulating layer that insulates between wirings of multilayer wiring and between elements. The insulating layer 90 is made of, for example, silicon oxide ($SiO_x$), silicon nitride ($SiN_x$), silicon carbide (SIC), chromium nitride, silicon carbonitride (SiCN), silicon oxynitride (SiON), aluminum oxide ($Al_2O_3$), zirconium oxide ($ZrO_x$), and the like.

The first conductive layer 10 contacts the capacitance layer 30. In the first conductive layer 10, the x-direction length is longer than the y-direction length when viewed from the z direction. By lengthening the x-direction length of the first conductive layer 10, the moving range of the domain wall DW can be widened.

The first conductive layer 10 is a ferromagnetic layer containing a ferromagnetic material. The first conductive layer 10 may be a ferromagnetic layer made of a ferromagnetic material.

The ferromagnetic material may be, for example, a metal selected from the group consisting of Cr, Mn, Co, Fe, and Ni, an alloy containing one or more of these metals, or an alloy containing these metals and at least one or more elements of B, C, and N. The ferromagnetic material may include, for example, any one selected from the group consisting of a CoPt alloy, a CoNi alloy, a TbFeCo alloy, a CoFe alloy, and a partially substituted alloy. The ferromagnetic materials are, for example, Co—Fe, Co—Fe—B, and Ni—Fe.

The ferromagnetic material may be, for example, a Heusler alloy. The Heusler alloy is a half-metal and has high spin polarization. The Heusler alloy is an intermetallic compound with a chemical composition of XYZ or $X_2YZ$, X is a Co, Fe, Ni, or Cu group transition metal element or noble metal element on the periodic table, Y is a Mn, V, Cr, or Ti group transition metal or X element species, and Z is a typical element from group III to group V. Examples of the Heusler alloy include $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, and the like.

The first conductive layer 10 includes a first magnetic domain A1 and a second magnetic domain A2. A domain wall DW exists at the boundary between the first magnetic domain A1 and the second magnetic domain A2.

The domain wall DW is configured to move an area of the first conductive layer which overlaps at least the capacitance layer 30 in the laminating direction in a first direction within the plane of the first conductive layer 10. For example, the domain wall DW is configured to move in the x direction within the first conductive layer 10.

The domain wall DW moves in the x direction by changing the potential difference between the first electrode 40 and the second electrode 50. The domain wall DW moves, for example, when a writing current (for example, a writing pulse) is applied in the x direction of the first conductive layer 10 or an external magnetic field is applied to the first conductive layer 10. For example, when a writing pulse is applied between the first electrode 40 and the second electrode 50, the domain wall DW moves.

The first magnetic domain A1 includes a first area A11 and a second area A12. The magnetization inside the first magnetic domain A1 is oriented in the same direction. The magnetization $M_{A11}$ of the first area A11 and the magnetization $M_{A12}$ of the second area A12 are oriented in the same direction.

The first area A11 is an area which overlaps the first electrode 40 when viewed from the z direction and is an area which has fixed magnetization $M_{A11}$. Fixed magnetization means that the magnetization does not reverse during normal operation of the variable capacitor 100 (no external force beyond assumption is applied). The first area A11 is called a first magnetization fixed area.

The second area A12 is an area other than the first area A11 inside the first magnetic domain A1. The volume of the second area A12 changes as the domain wall DW moves.

The second magnetic domain A2 includes a third area A21 and a fourth area A22. The magnetization of the second magnetic domain A2 is oriented in the same direction. The magnetization inside the second magnetic domain A2 is oriented in a direction different from the magnetization inside the first magnetic domain A1. The magnetization $M_{A21}$ of the third area A21 and the magnetization $M_{A22}$ of the fourth area A22 are oriented in the same direction.

The third area A21 is an area which overlaps the second electrode 50 when viewed from the z direction and is an area which has fixed magnetization $M_{A21}$. The third area A21 is called a second magnetization fixed area.

The fourth area A22 is an area other than the third area A21 inside the second magnetic domain A2. The volume of the fourth area A22 changes as the domain wall DW moves.

The second area A12 and the fourth area A22 are collectively called a domain wall moving area. The domain wall moving area is sandwiched between the first magnetization fixed area and the second magnetization fixed area.

The second conductive layer 20 contacts the capacitance layer 30. The first conductive layer 10 and the second conductive layer 20 sandwich the capacitance layer 30.

The second conductive layer 20 is a ferromagnetic layer containing a ferromagnetic material. The second conductive layer 20 may be a ferromagnetic layer formed of a ferromagnetic material. The same material as the material forming the first conductive layer 10 can be used for the second conductive layer 20. The material forming the second conductive layer 20 and the material forming the first conductive layer 10 may be the same or different.

The magnetization $M_{20}$ of the second conductive layer 20 more difficult to reverse than the magnetization of the first conductive layer 10. For example, the second conductive layer 20 is closer to the substrate Sub described later than the first conductive layer 10. Such an element structure is called a bottom pin structure.

The second conductive layer 20 includes, for example, the first conductive layer when viewed from the z direction. When the area of the second conductive layer 20 is larger than the area of the first conductive layer 10, the flatness of the first conductive layer 10 is improved and the domain wall DW moves smoothly.

The capacitance layer 30 is sandwiched between the first conductive layer 10 and the second conductive layer 20. The capacitance layer 30 is a dielectric layer. The capacitance layer 30 has insulating properties and charges are accumulated in each of the first conductive layer 10 and the second conductive layer 20 sandwiching the capacitance layer 30.

The capacitance layer 30 contains, for example, any one selected from a group consisting of magnesium oxide (MgO), aluminum oxide ($Al_2O_3$), titanium oxide ($TiO_2$), barium titanate ($BaTiO_3$), magnesium aluminate ($MgAl_2O_4$), silicon oxide ($SiO_2$), magnesium titanate ($MgTiO_3$), and hafnium oxide ($HfO_2$). The composition ratio of each element in these oxides is not limited to the stoichiometric composition. When the capacitance layer 30 contains these materials, the variation width of the capacitance of the variable capacitor 100 increases.

The capacitance layer 30 may contain, for example, aluminum nitride (AlN) or aluminum nitride to which any one selected from a group consisting of calcium, strontium, titanium, and potassium is added. When the capacitance layer 30 contains these materials, there is an effect of increasing capacitance. In addition, when the capacitance layer 30 contains these materials, the electrical conductivity of the capacitance layer 30 is improved and heat generation due to energization can be suppressed. As a result, it is possible to suppress a large change in the temperature of the variable capacitor 100 during use. This is an important property for use in extreme environments.

The capacitance layer 30 may contain any one selected from a group consisting of lead titanate ($PbTiO_3$), strontium titanate ($SrTiO_3$), lead zirconate ($PbZrO_3$), lead hafnate ($PbHfO_3$), and relaxor ferroelectrics. When the capacitance layer 30 contains these materials, the dielectric constant of the capacitance layer 30 increases and the capacitance of the variable capacitor 100 increases.

Additionally, the relaxor dielectric is a composite perovskite oxide represented by $A(B'B'')O_3$. For example, $A(B'^{2+}_{1/3}B''^{5+}_{2/3})O_3$, $A(B'^{3+}_{1/2}B''^{5+}_{1/2})O_3$ is an example of the relaxor dielectric. $Pb(Mg_{1/3}Nb_{2/3})O_3$, $Pb(Zn_{1/3}Nb_{2/3})O_3$, $Pb(In_{1/2}Nb_{1/2})O_3$, $Pb(Sc_{1/2}Nb_{1/2})O_3$, and $Pb(Mg_{1/2}W_{1/2})O_3$ are specific examples of the relaxor dielectrics.

The thickness of the capacitance layer 30 is, for example, 35 Å or more and preferably 100 Å or more. When the thickness of the capacitance layer 30 is sufficiently thick, the insulation of the capacitance layer 30 is ensured and the variable capacitor 100 functions stably.

The electrical resistance of the capacitance layer 30 is, for example, 1 MΩ or more and preferably 10 MΩ or more. When the insulation of the capacitance layer 30 is ensured, the variable capacitor 100 functions stably.

The lattice matching between the capacitance layer 30 and the first conductive layer 10 is, for example, less than 10% and preferably 5% or less. The lattice matching between the capacitance layer 30 and the second conductive layer 20 is, for example, less than 10% and preferably 5% or less.

Regarding the lattice matching, a higher value indicates that the adjacent layers are not lattice-matched, and a lower value indicates that the adjacent layers are lattice-matched. The lattice matching means that atoms are arranged continuously in the laminating direction at the interface between adjacent layers. When the capacitance layer 30 and the adjacent layer are lattice-matched, the variation width of the capacitance of the variable capacitor 100 increases.

The lattice matching is a value obtained by dividing the difference between the lattice constant of the capacitance layer 30 and the lattice constant of the adjacent layer (the first conductive layer 10 or the second conductive layer 20)

by the lattice constant of the adjacent layer (the first conductive layer 10 or the second conductive layer 20).

For example, the lattice matching between the capacitance layer 30 and the first conductive layer 10 is obtained by the following formula.

"Lattice matching"="(lattice constant of capacitance layer 30)–(lattice constant of first conductive layer 10)"/"lattice constant of first conductive layer 10"×100

It is preferable that at least one of the first conductive layer 10, the capacitance layer 30, and the second conductive layer 20 epitaxially grow from the substrate Sub. When these layers are epitaxially grown, the variation width of the capacitance of the variable capacitor 100 increases.

The lattice matching between the capacitance layer 30 and the first conductive layer 10 may be, for example, 10% or more. The lattice matching between the capacitance layer 30 and the second conductive layer 20 may be, for example, 10% or more. In this case, the capacitance layer 30 and the adjacent layer are not lattice-matched and some of the atoms are not continuously arranged at the interface of these layers. That is, the capacitance layer 30 does not epitaxially grow from the substrate Sub.

The capacitance layer 30 may maintain the insulation between the first conductive layer 10 and the second conductive layer 20 and the interface between them may not be lattice-matched. When the capacitance layer 30 is not lattice-matched to the adjacent layer, the contact resistance at the interface increases and hence the capacitance of variable capacitor 100 increases. Further, any one of the capacitance layer 30 and the first conductive layer 10 or the second conductive layer 20 is amorphous and lattice matching may not occur at the interface between the capacitance layer 30 and the first conductive layer 10 or the second conductive layer 20. If the capacitance layer 30 and adjacent layer are not lattice-matched, each layer is less likely to be affected by the adjacent layer, and variations in device characteristics among a plurality of devices are reduced.

The first electrode 40 contacts directly or indirectly a part of the first conductive layer 10. The indirect contacting means that another layer is sandwiched between the first electrode 40 and the first conductive layer 10. The first electrode 40 contacts, for example, the first end of the first conductive layer 10. The first electrode 40 contacts, for example, the first magnetic domain A1 of the first conductive layer 10.

The first electrode 40 is, for example, a ferromagnetic layer. For example, the same material as those of the first conductive layer 10 and the second conductive layer 20 can be applied to the first electrode 40. For example, the magnetization $M_{40}$ of the first electrode 40 is oriented in the same direction as the magnetization $M_{A11}$ of the first area A11 to fix the magnetization $M_{A11}$ of the first area A11.

The first electrode 40 may not be a ferromagnetic layer. The current density of the current flowing through the first conductive layer 10 sharply decreases at the position from the second area A12 to the first area A11. Since the domain wall DW cannot enter the first area A11 when the current density of the current flowing through the first conductive layer 10 drops suddenly, the first electrode 40 may not be a ferromagnetic material.

The second electrode 50 directly or indirectly contacts a part of the first conductive layer 10. The second electrode 50 contacts, for example, the second end of the first conductive layer 10. The second electrode 50 and the first electrode 40 are separated from each other in the x direction. The second electrode 50 contacts, for example, the second magnetic domain A2 of the first conductive layer 10.

The second electrode 50 is, for example, a ferromagnetic layer. For example, the same material as the first electrode 40 can be applied to the second electrode 50. The magnetization $M_{50}$ of the second electrode 50 fixes the magnetization $M_{A21}$ of the third area A21. The second electrode 50 is not limited to the ferromagnetic layer similarly to the first electrode 40.

The third electrode 60 contacts the second conductive layer 20. The third electrode 60 is a conductor.

The variable capacitor 100 may include layers other than those described above. For example, the variable capacitor 100 may include a nonmagnetic layer which contacts the surface on the side opposite to the surface contacting the capacitance layer 30 of the second conductive layer 20 and a ferromagnetic layer which sandwiches the nonmagnetic layer together with the second conductive layer 20. The second conductive layer 20, the nonmagnetic layer, and the ferromagnetic layer have a synthetic antiferromagnetic structure (SAF structure). The SAF structure enhances the coercivity of the second conductive layer 20.

For example, the magnetization direction of each layer of the variable capacitor 100 can be confirmed by measuring a magnetization curve. The magnetization curve can be measured using, for example, magneto optical Kerr effect (MOKE). Measurement by MOKE is a measurement method in which linearly polarized light is incident on an object to be measured and a magneto-optical effect (magnetic Kerr effect) in which the polarization direction of the object is caused to rotate is used.

The variable capacitor 100 is formed by laminating each layer and processing a part of each layer into a predetermined shape. A sputtering method, a chemical vapor deposition (CVD) method, an electron beam vapor deposition method (EB vapor deposition method), an atomic laser deposition method, or the like can be used for laminating each layer. Each layer can be processed using photolithography and etching (for example, Ar etching).

Next, the function of the variable capacitor 100 will be described. The variable capacitor performs a capacitance adjustment process and a charge accumulation process.

The capacitance adjustment process of the variable capacitor 100 will be described. In the capacitance adjustment process, a potential difference is applied between the first electrode 40 and the second electrode 50 and a writing current (writing pulse) is applied to the first conductive layer 10. The variable capacitor 100 changes the capacitance in an analog manner by applying an electric signal in one direction in the plane of the first conductive layer 10.

The writing current (writing pulse) moves the domain wall DW in the first conductive layer 10. The position of the domain wall DW changes in accordance with the magnitude of the writing current (writing pulse).

The capacitance of the variable capacitor 100 is increased as an area having an antiparallel relationship of the magnetization $M_{20}$ of the second conductive layer 20 and the magnetization of the first conductive layer 10 is widened and is decreased as an area having a parallel relationship of the magnetization $M_{20}$ of the second conductive layer 20 and the magnetization of the first conductive layer 10 is widened. In the variable capacitor 100 shown in FIG. 2, the capacitance of the variable capacitor 100 is increased as the first magnetic domain A1 is widened and the capacitance of the variable capacitor 100 is decreased as the second magnetic domain A2 is widened.

Next, the charge accumulation process of the variable capacitor 100 will be described. In the charge accumulation process, a potential difference is applied between the second electrode 50 and the third electrode 60. When a potential difference is applied between the second electrode 50 and the third electrode 60, a charge is accumulated in each of the first conductive layer 10 and the second conductive layer 20. The capacitance of the variable capacitor 100 is determined by the capacitance adjustment process and the variable capacitor 100 accumulates charges corresponding to the capacitance and functions as a normal capacitor.

Since the capacitance of the variable capacitor 100 is determined by the magnetization state of the two ferromagnetic layers sandwiching the capacitance layer 30, the capacitance changes even in extreme environments in principle. For example, the variable capacitor 100 has a minimum capacitance of 1 pF or more in an extreme temperature range 10K or less or 1000K or more.

As described above, the variable capacitor 100 is formed as thin film laminates and is compact. Further, the variable capacitor 100 according to this embodiment does not require a mechanical operating mechanism to change the capacitance, and can be miniaturized. Further, the variable capacitor 100 according to this embodiment changes the capacitance in an analog manner not by mechanical operation but by an electrical signal.

Figure 3:
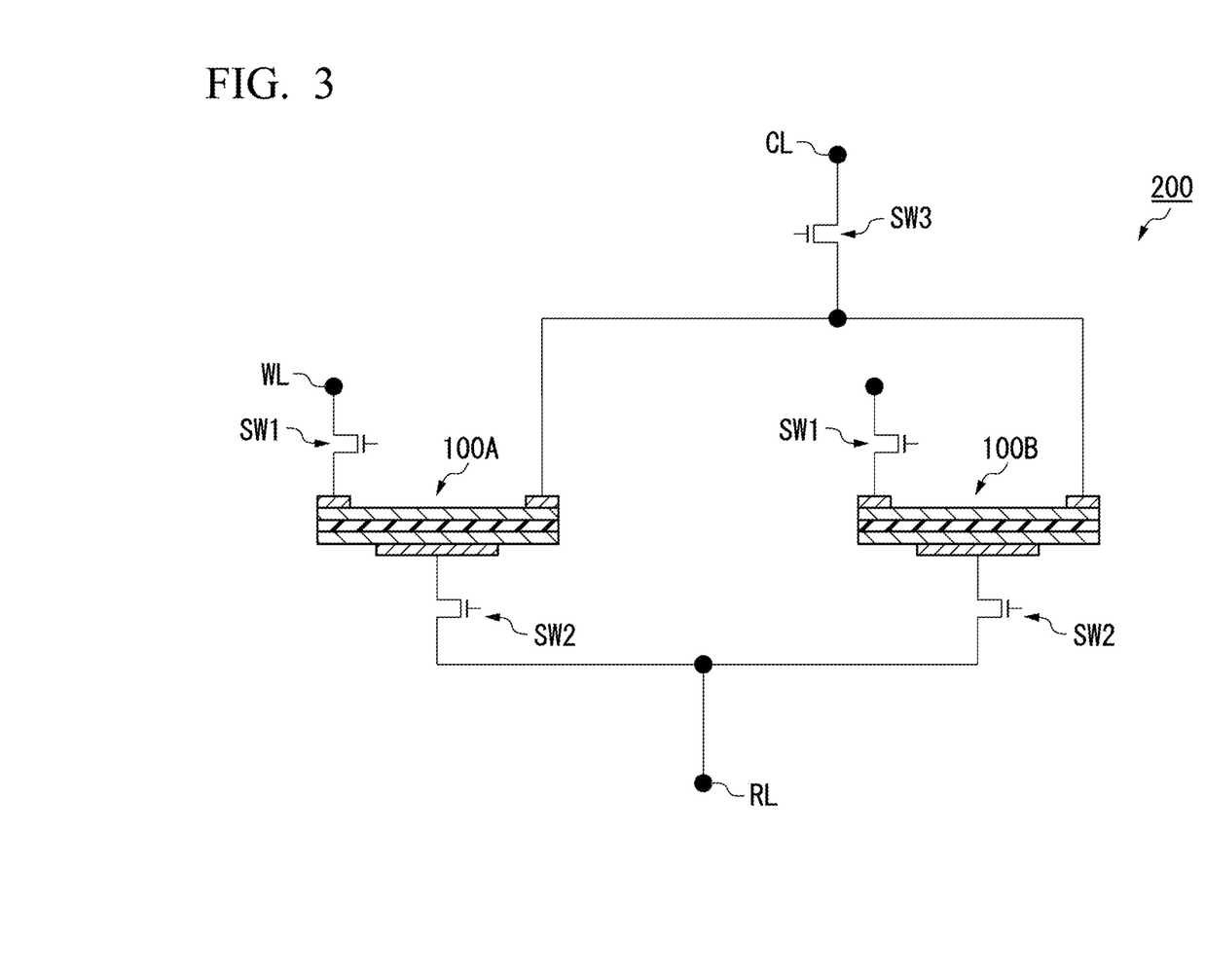
FIG. 3 is a circuit diagram of a part of an integrated circuit according to the first embodiment.
Figure 4:
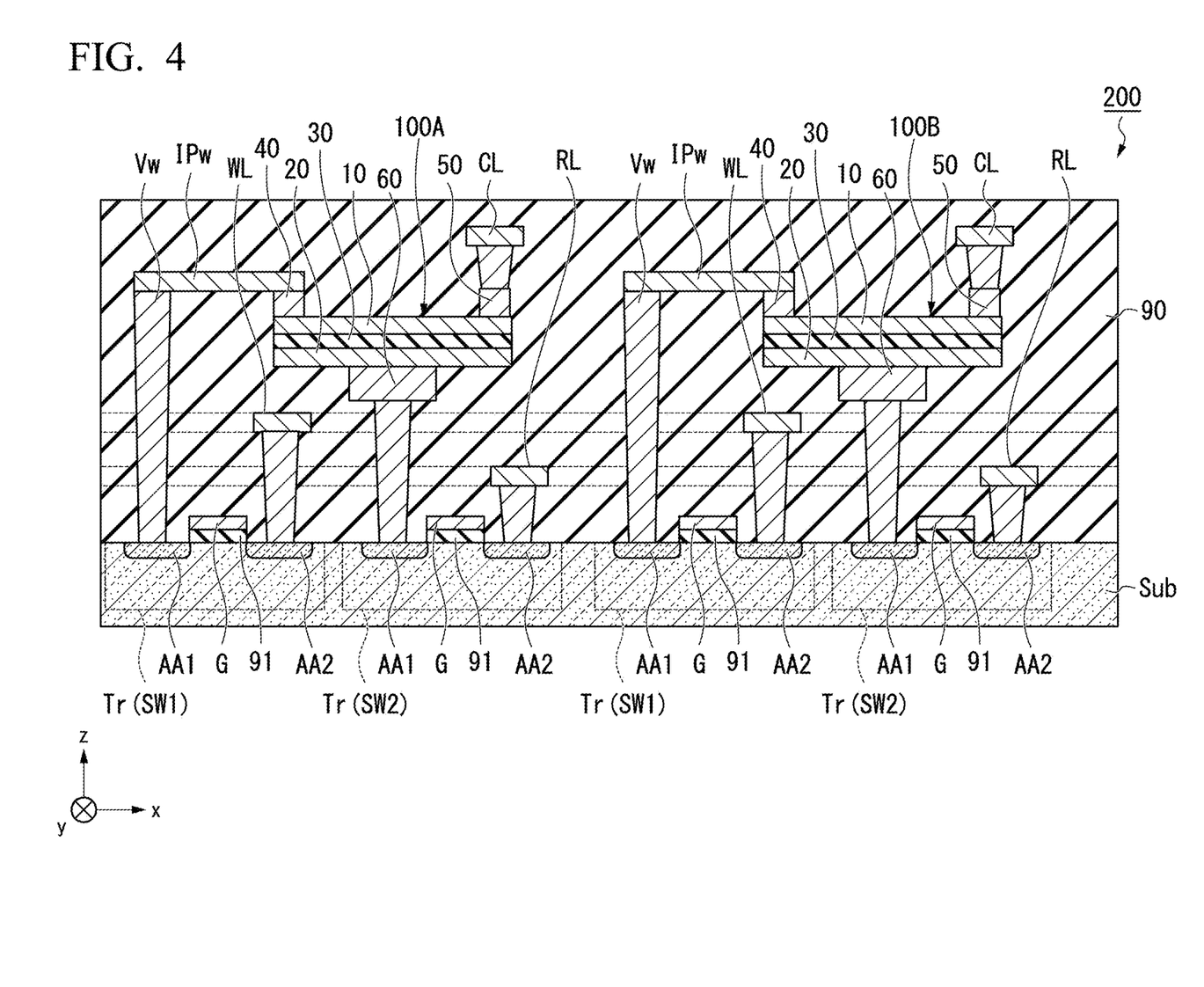
FIG. 4 is a cross-sectional view of a part of the integrated circuit according to the first embodiment.

FIG. 3 is a circuit diagram of a part of an integrated circuit 200 according to the first embodiment. FIG. 4 is a cross-sectional view of a part of the integrated circuit 200 according to the first embodiment.

The integrated circuit 200 includes a first variable capacitor 100A and a second variable capacitor 100B. Each of the first variable capacitor 100A and the second variable capacitor 100B is the above-described variable capacitor 100.

Each of the first variable capacitor 100A and the second variable capacitor 100B performs the capacitance adjustment process by turning on a first switching element SW1 and a third switching element SW3 and adjusting a potential between a writing line WL and a common line CL.

Each of the first variable capacitor 100A and the second variable capacitor 100B performs the charge accumulation process by turning on a second switching element SW2 and a third switching element SW3 and adjusting a potential between a reading line RL and the common line CL. The first variable capacitor 100A and the second variable capacitor 100B are connected in parallel to each other between the reading line RL and the common line CL. Since the first variable capacitor 100A and the second variable capacitor 100B are connected in parallel to each other, the maximum value of the combined capacitance of two variable capacitors can be increased.

Each of the first switching element SW1, the second switching element SW2, and the third switching element SW3 is an element that controls the flow of a current. Each of the first switching element SW1, the second switching element SW2, and the third switching element SW3 is, for example, a transistor, an element such as an Ovonic Threshold Switch (OTS) that uses a phase change of a crystal layer, an element such as a metal-insulator transition (MIT) switch that uses a change of a band structure, an element such as a Zener diode and an avalanche diode that uses a breakdown voltage, and an element that changes conductivity with a change in atomic position.

A via wiring Vw and an in-plane wiring IPw electrically connect the switching element and the variable capacitor.

The first variable capacitor 100A and the second variable capacitor 100B may have the same or different capacitance. For example, the capacitance of the first variable capacitor 100A may be larger than the capacitance of the second variable capacitor 100B. In this case, the combined capacitance of two variable capacitors can be coarsely adjusted with the first variable capacitor 100A and finely adjusted with the second variable capacitor 100B.

Second Embodiment

Figure 5:
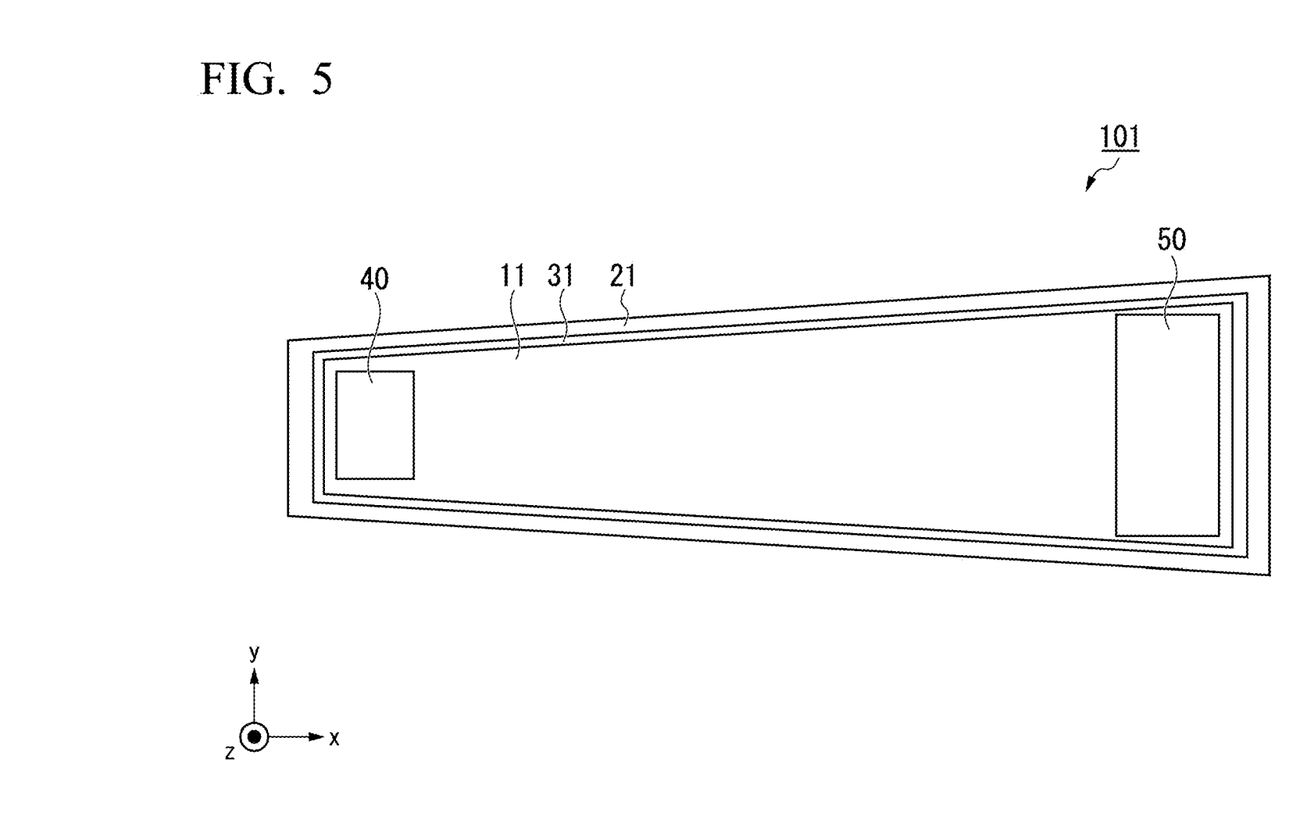
FIG. 5 is a plan view of a variable capacitor according to a second embodiment.

FIG. 5 is a plan view of a variable capacitor 101 according to a second embodiment. The cross-sectional view of the variable capacitor 101 according to the second embodiment is the same as FIG. 2. In the variable capacitor 101, the same components as in the variable capacitor 100 are denoted by the same reference numerals, and a description thereof is omitted.

The variable capacitor 101 includes a first conductive layer 11, a second conductive layer 21, and a capacitance layer 31. The first conductive layer 11 corresponds to the first conductive layer 10 except for the shape in the plan view. The second conductive layer 21 corresponds to the second conductive layer 20 except for the shape in the plan view. The capacitance layer 31 corresponds to the capacitance layer except for the shape in the plan view.

Each of the first conductive layer 11, the second conductive layer 21, and the capacitance layer 31 does not have a constant width in the y direction when viewed from the z direction. In FIG. 5, the width of these layers is gradually increased from the first end to the second end in the x direction. For example, the first conductive layer 11 is gradually widened from the first end to the second end of the first conductive layer 11. The width of these layers may be gradually decreased from the first end to the second end in the x direction.

Figure 6:
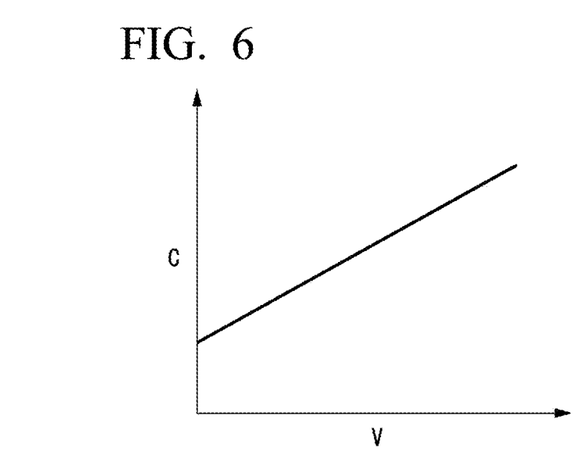
FIG. 6 is a diagram showing a change in capacitance of the variable capacitor according to the first embodiment.
Figure 7:
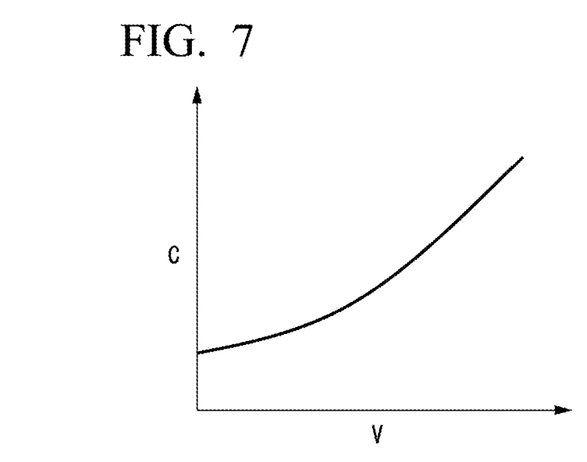
FIG. 7 is a diagram showing a change in capacitance of the variable capacitor according to the second embodiment.

FIG. 6 is a diagram showing a change in capacitance of the variable capacitor 100 according to the first embodiment. FIG. 7 is a diagram showing a change in capacitance of the variable capacitor 101 according to the second embodiment. The horizontal axis indicates the intensity of the energy applied in the capacitance adjustment process, such as the writing voltage and the number of writing pulse applications. The vertical axis indicates the capacitance of the variable capacitor 100.

When the y-direction width of the first conductive layer 10 is constant as shown in FIG. 6, the capacitance of the variable capacitor 100 changes monotonically. On the other hand, when the y-direction width of the first conductive layer 11 increases monotonically as shown in FIG. 7, the variation width of the capacitance of the variable capacitor 101 increases stepwise.

The variable capacitor 101 according to the second embodiment has the same effect as the variable capacitor 100 according to the first embodiment. Further, since the y-direction width of the first conductive layer 11 is not constant, the change state of the capacitance of the variable capacitor 101 can be freely set. The variable capacitor 101 can be applied to the first variable capacitor 100A and the second variable capacitor 100B of the above-described integrated circuit 200.

Third Embodiment

Figure 8:
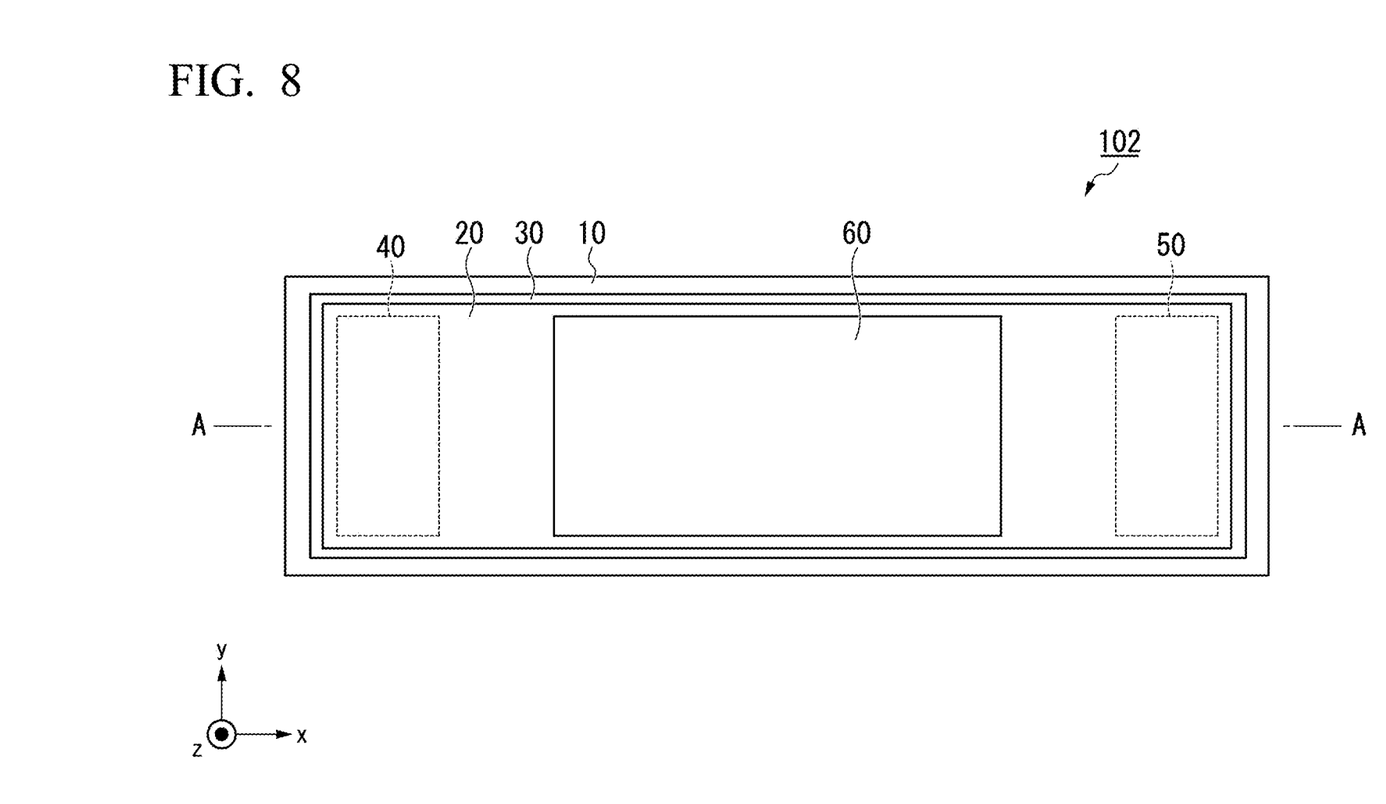
FIG. 8 is a plan view of a variable capacitor according to a third embodiment.
Figure 9:
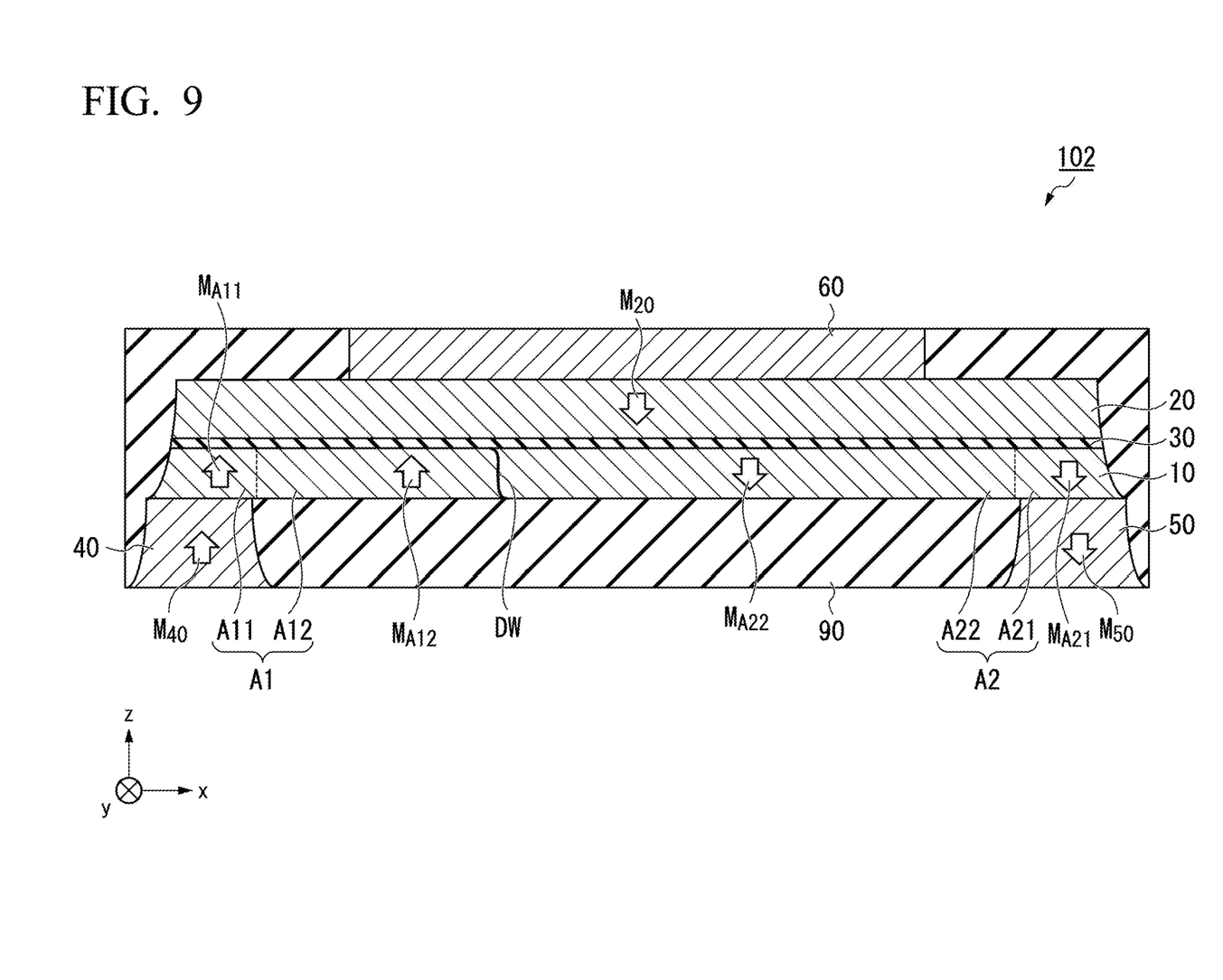
FIG. 9 is a cross-sectional view of the variable capacitor according to the third embodiment.

FIG. 8 is a plan view of a variable capacitor 102 according to a third embodiment. FIG. 9 is a cross-sectional view of the variable capacitor 102 according to the third embodiment and is a cross-section taken along a line A-A of FIG. 8. In the variable capacitor 102, the same components as in the variable capacitor 100 are denoted by the same reference numerals, and a description thereof is omitted.

The variable capacitor 102 is different from the variable capacitor 100 in the positional relationship between the first conductive layer 10 and the second conductive layer 20. The variable capacitor 102 has the second conductive layer 20 separated from the substrate Sub and is referred to as a top pin structure.

The variable capacitor 102 according to the third embodiment has the same effect as the variable capacitor 100 according to the first embodiment. Further, the variable capacitor 102 can be applied to the first variable capacitor 100A and the second variable capacitor 100B of the above-described integrated circuit 200.

Although several embodiments of the present invention have been described in detail above, the present invention is not limited to these embodiments.

REFERENCE SIGNS LIST 10, 11 First conductive layer
20, 21 Second conductive layer
30, 31 Capacitance layer
40 First electrode
50 Second electrode
60 Third electrode
90 Insulating layer
100, 101, 102 Variable capacitor
100A First variable capacitor
100B Second variable capacitor
200 Integrated circuit
A1 First magnetic domain
A2 Second magnetic domain
A11 First area
A12 Second area
A21 Third area
A22 Fourth area

What is claimed is:

1. A variable capacitor comprising:
a first conductive layer;
a second conductive layer; and
a capacitance layer sandwiched between the first conductive layer and the second conductive layer,
wherein each of the first conductive layer and the second conductive layer is a ferromagnetic layer containing a ferromagnetic material,
wherein the first conductive layer has a first magnetic domain and a second magnetic domain having magnetization oriented in a direction different from the first magnetic domain, and
wherein a domain wall which is a boundary between the first magnetic domain and the second magnetic domain is configured to be movable within at least an area of the first conductive layer overlapping the capacitance layer in a laminating direction in a first direction within a plane of the first conductive layer.

2. The variable capacitor according to claim 1, further comprising:
a first electrode; and
a second electrode,
wherein the first electrode contacts the first magnetic domain of the first conductive layer, and
wherein the second electrode contacts the second magnetic domain of the first conductive layer.

3. The variable capacitor according to claim 2,
wherein the first electrode is a ferromagnetic layer, and
wherein the magnetization of the first electrode is oriented in the same direction as the magnetization of the first magnetic domain.

4. The variable capacitor according to claim 2,
wherein the second electrode is a ferromagnetic layer, and
wherein the magnetization of the second electrode is oriented in the same direction as the magnetization of the second magnetic domain.

5. The variable capacitor according to claim 1,
wherein the capacitance layer contains any one selected from a group consisting of magnesium oxide, aluminum oxide, titanium oxide, barium titanate, magnesium aluminate, silicon oxide, magnesium titanate, and hafnium oxide.

6. The variable capacitor according to claim 1,
wherein the capacitance layer contains aluminum nitride or aluminum nitride to which any one selected from a group consisting of calcium, strontium, titanium, and potassium is added.

7. The variable capacitor according to claim 1,
wherein the capacitance layer contains any one selected from a group consisting of lead titanate, strontium titanate, lead zirconate, lead hafnate, and relaxor ferroelectrics.

8. The variable capacitor according to claim 1,
wherein the first conductive layer or the second conductive layer contains any one selected from a group consisting of a Heusler alloy, a CoPt alloy, a CoNi alloy, a TbFeCo alloy, a CoFe alloy, and a partially substituted thereof.

9. The variable capacitor according to claim 1, further comprising:
a substrate,
wherein at least one of the first conductive layer, the capacitance layer, and the second conductive layer epitaxially grows from the substrate.

10. The variable capacitor according to claim 1,
wherein lattice matching obtained by dividing a difference between a lattice constant of the capacitance layer and a lattice constant of the first conductive layer by the lattice constant of the first conductive layer is 10% or more.

11. The variable capacitor according to claim 1,
wherein the first conductive layer does not have a constant width in a second direction orthogonal to the first direction when viewed from the laminating direction, and
wherein the width is gradually increased or decreased from a first end to a second end of the first conductive layer.

12. The variable capacitor according to claim 1,
wherein a minimum capacitance value is 1 pF or more in a temperature range of 10 K or less or 1000 K or more.

13. A variable capacitor comprising:
a first conductive layer;
a second conductive layer; and
a capacitance layer sandwiched between the first conductive layer and the second conductive layer,
wherein each of the first conductive layer and the second conductive layer is a ferromagnetic layer containing a ferromagnetic material, and
wherein a capacitance changes in an analog manner by applying an electrical signal in one direction within a plane of the first conductive layer.

14. An integrated circuit comprising:
a first variable capacitor; and
a second variable capacitor, wherein each of the first variable capacitor and the second variable capacitor is the variable capacitor according to claim 1, and wherein the first variable capacitor and the second variable capacitor are connected in parallel to each other.

15. The integrated circuit according to claim 13, wherein the first variable capacitor and the second variable capacitor have different capacitances.

\* \* \* \* \*